INVENTORS.
RUSSELL T. STEWART
WILLIAM D. STEWART

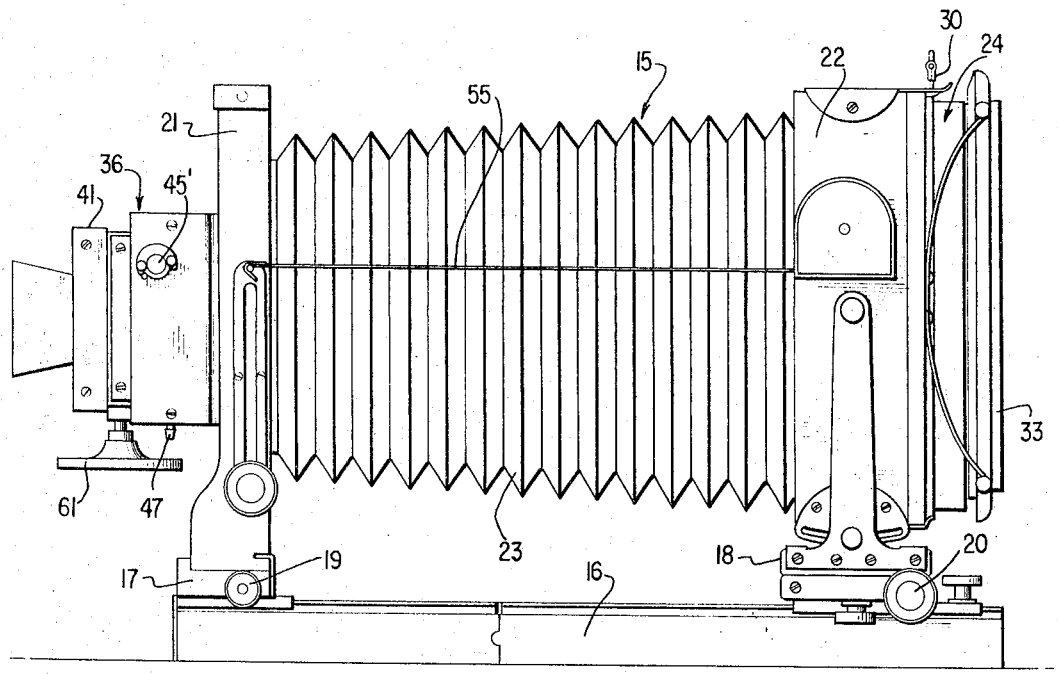
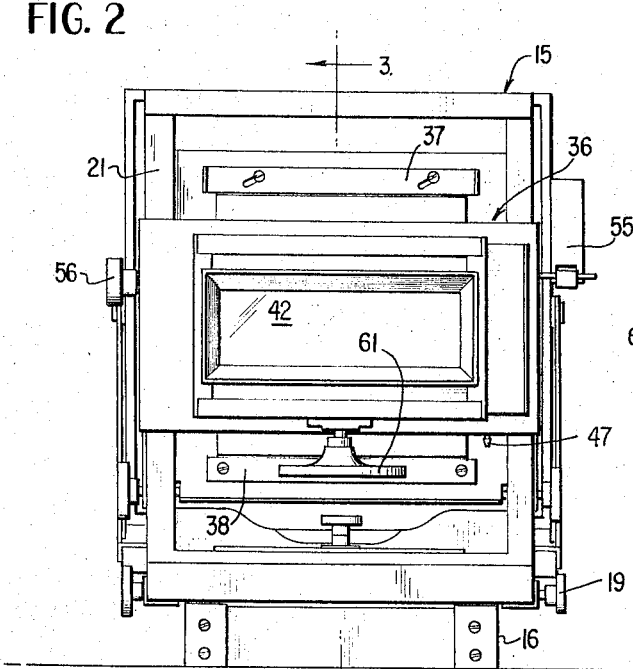
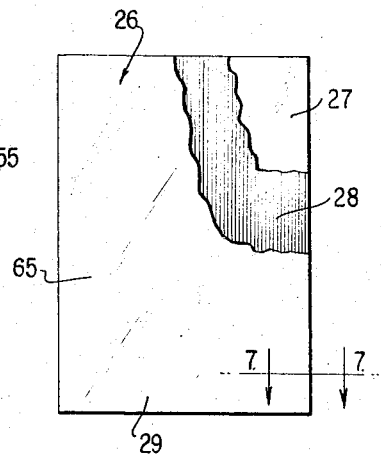

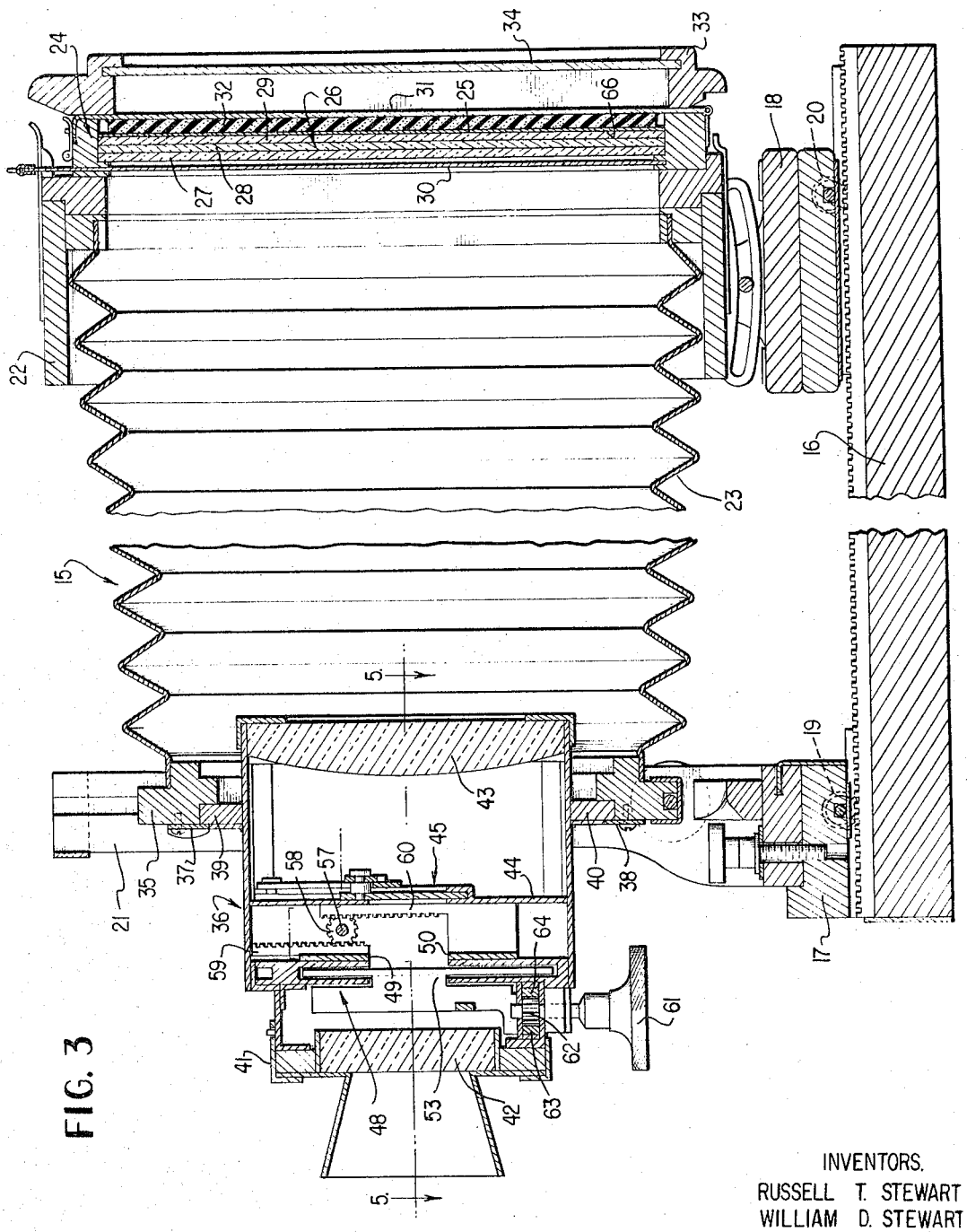

BY
ATTORNEY.

United States Patent Office 3,301,154
Patented Jan. 31, 1967

3,301,154
STEREOSCOPIC PICTURE CAMERA AND LEN-
TICULAR SCREEN ASSEMBLY THEREFOR
Russell T. Stewart, 7801 Ventnor Ave., Margate City,
N.J. 08402, and William D. Stewart, 4351 4th St.
SE., Washington, D.C. 20032
Filed Dec. 29, 1964, Ser. No. 421,820
2 Claims. (Cl. 95—18)

This invention relates to the production of pictures which are viewable in stereoscopic relief and more particularly to a method of and apparatus for producing instantaneous stereoscopic pictures photographically, and also to a lenticular screen assembly utilized in the method.

In order to view an object in stereoscopic relief, the object must be simultaneously viewed from two points of view. When a person having normal binocular vision focuses his eyes upon an object, each of his eyes sees the object from a different point of view due to the normal eye spacing which is usually about two and one-half inches, known as the interpupillary distance. Moreover, each of the eyes sees the object in a different relation to objects in the foreground and objects in the background. The brain resolves the different images formed in the two eyes and an impression of stereoscopic relief is obtained. To obtain stereoscopic relief photographically, it is necessary to photograph a right eye view and a left eye view of the same object and bring these two views separately to the separate eyes of the observer.

It has been proposed to pass light received from two different viewing points of an object through a lenticular screen, so as to cause a plurality of small elements of each view to fall separately onto a photographic film. Such screens are well-known in the art and prior United States Patents 1,128,979, 2,140,702, 2,562,077 and 2,351,032 contain examples of this teaching. A lenticular screen may be placed over a picture thus made and will cause the image from the elements forming one view of the object to be directed to one eye of the observer and the image from the elements forming a second view of the object to be directed to the other eye of the observer. In such case, each eye will see only its own view of the object and a stereoscopic effect will be obtained.

It is the main object of this invention to improve upon the prior art through the provision of a camera, method and particular lenticular screen assembly which allows the taking of instantaneous (one shot) stereoscopic pictures under varying light conditions.

It is a further and more specific object of the invention to provide a lenticular screen assembly which consists of a pair of forward pivoting or image reversal screens in conjunction with a third opposed lenticular screen which is the "taking" screen arranged adjacent the photographic film. This unique screen arrangement coacts with the remainder of the camera to consistently produce greatly superior stereoscopic pictures by an instantaneous one-shot photographic method.

Stereoscopic pictures obtained in accordance with the invention herein have a greatly improved illusion of depth when viewed by an observer and the ilusion is maintained as the observer backs away from the picture or stands at a relatively great distance therefrom. This is not the case in the conventional practice where the picture is taken through a single lenticular screen. In such case, the picture obtained can be viewed from a short distance only and the illusion is quickly lost and the picture seems to become scrambled as the viewer backs away. This effect is completely overcome under the invention by utilizing the two front pivot or reversal screens in front of the third lenticular image spreading or separating screen, known as the "taking" screen.

Other objects and advantages of the invention will be apparent during the course of the following description.

In the accompanying drawings forming a part of this application and in which like numerals are employed to designate like parts throughout the same, FIGURE 1 is a side elevation of the camera for taking stereoscopic pictures in accordance with the invention;

FIGURE 2 is a front elevation of the camera shown in FIGURE 1;

FIGURE 3 is an enlarged central vertical longitudinal section taken on line 3—3 of FIGURE 2, partly broken away;

FIGURE 6 is a plan view of a lenticular screen assembly, partly broken away.

Figure 4:
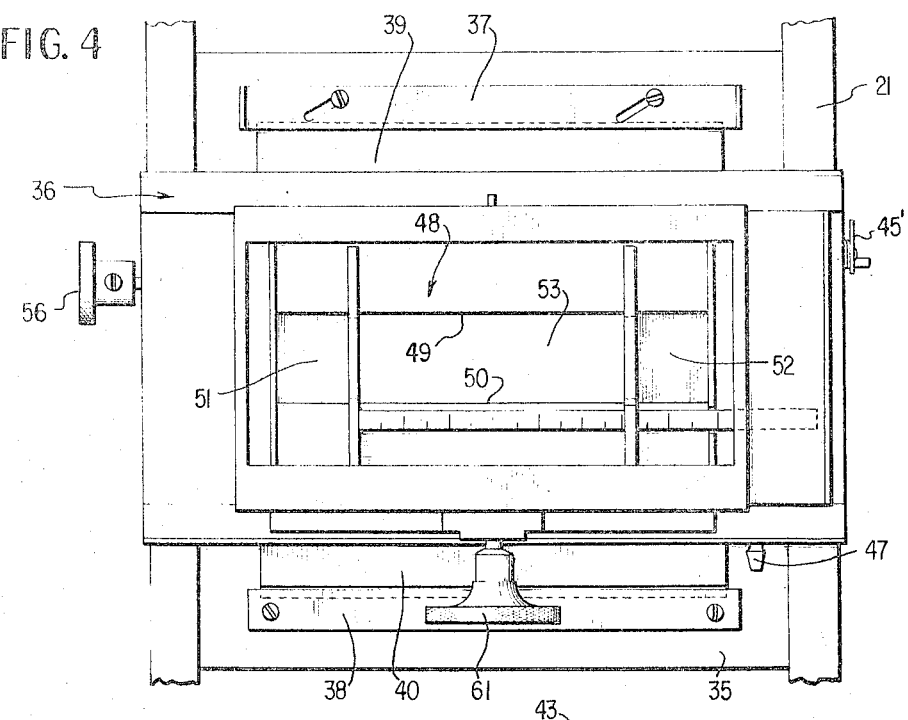
FIGURE 4 is an enlarged front elevation of the camera, partly broken away, with the front lens holder removed to reveal an adjustable light gate structure.

In the drawings, wherein for the purpose of illustration is shown a preferred embodiment of the invention, the numeral 15 designates a studio-type camera in its entirety, including a horizontal support track 16 of conventional construction and front and rear carriages 17 and 18 mounted for movement on the track to allow adjusting and focusing of the camera. Adjusting hand wheels 19 and 20 are provided for moving the carriages 17 and 18 on the track structure. The carriage 17 has a forward upright frame 21 mounted thereon and the carriage 18 has a rear frame 22 thereon which also constitutes a housing for an opaque bellows 23 which interconnects the two frames 21 and 22.

Figure 7:
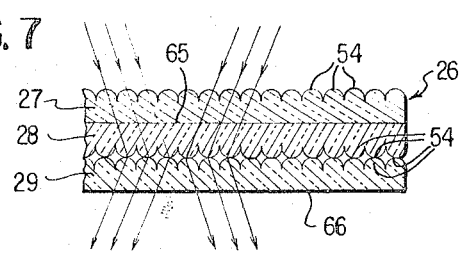
FIGURE 7 is an enlarged fragmentary horizontal section taken on line 7—7 of FIGURE 6.

Mounted upon the rear frame 22 in a conventional manner and bodily removable therefrom is a film holder 24, adapted to hold photographic film 25, FIGURE 3, and a lenticular screen assembly 26 consisting of three separate screens 27, 28 and 29, FIGURE 7. The screen assembly 26 constitutes an important part of the invention which will be further described hereinafter.

The film holder 24 has the usual opaque pull-out panel 30 in advance of the screen assembly 26, and also has a hinged back cover plate 31 which may be opened for removal of the film. There is also a resilient sponge rubber pad 32 in the holder 24 between the film 25 and back cover plate 31 and this pad holds the film firmly against the lenticular screen assembly 26. The pad 32 is cemented to the back cover plate 31. The screen assembly 26 after proper selection and adjustment and preassembly is placed in the holder 24 and preferably forms a permanent part thereof. The holder 24 is removable through the top of frame 22 and is held in place by a spring-urged back frame 33, having a ground glass viewing plate 34 mounted therein.

The forward frame 21 has an internal vertically adjustable section 35 thereon, serving to bodily mount a lens housing 36, held in place on the frame section 35 by adjustable clamp plates 37 and 38, which overlap flange extensions 39 and 40 of the housing 36, as shown in the drawings.

The housing 36 includes a forward section 41 which is removable, and this forward section carries a forward lateally elongated condensing lens 42 having an effective aperture of at least two and one-half inches or the average interpupillary distance.

A magnifying lens 43 is mounted in the rear of housing 36 and spaced from the lens 42, as shown in FIGURE 3. The back lens 43 preferably has a focal length of about twenty-five inches The front lens 42 is selected so as to have a focal length suited to the type of subject or scene being photographed.

Intermediate the lenses 42 and 43 and within the housing 36 upon a partition structure 44 thereof is a shutter mechanism 45 of the chopper type utilizing a linkage operated by a plunger means 46 communicating with a pneumatic fitting 47, FIGURE 1, on the bottom of the housing 36. An elastic squeeze bulb and rubber tube, not shown, is connected with the fitting 47 to trip the shutter in a well known manner at the required time for exposing the film to light. On one side of housing 36 there is provided a turnable latch device 45', which in one position locks the shutter open for focusing the camera. After focusing, the device 45' is turned to a vertical position and the shutter is released and closes and the camera is then ready to take a picture when the elastic bulb, not shown, is squeezed.

Figure 5:
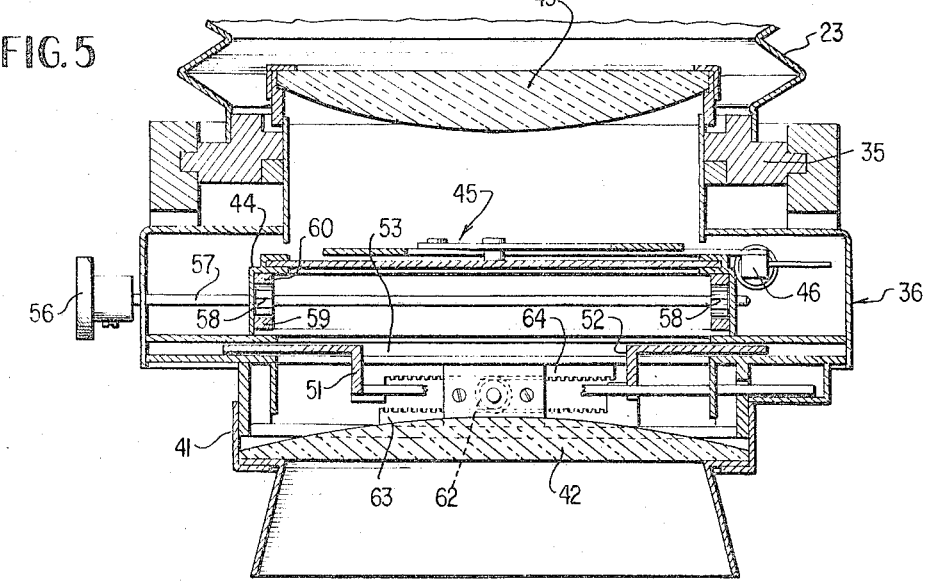
FIGURE 5 is an enlarged fragmentary horizontal section taken on line 5—5 of FIGURE 3.

Between the shutter mechanism 45 and front lens 42 is disposed an adjustable light gate 48 including vertically adjustable light blocking members 49 and 50, FIGURE 3, and horizontally adjustable companion light blocking members 51 and 52, FIGURE 5. These light blocking members coact to define behind the lens 42 a vertically and laterally adjustable rectangular light slit 53 which is horizontally or laterally elongated as shown in FIGURE 4. The major axis of the slit 53 is perpendicular to the longitudinal axes of the minute lens portion 54 or gofferings on the lenticular screens 27, 28 and 29.

The size of the slit 53 for any given photograph is a direct function of the distance between the film 25 and the aperture of lens 42. A distance measuring tape 55 on one side of the camera, FIGURE 1, indicates the distance between the lens and the film, and by consulting a related chart, not shown, the proper setting of the light blocking members 51 and 52 is determined and made. The members 51 and 52 control the amount of lens coverage laterally for a given distance between the lens and film and this is determined by reading the tape 55. As an example, when the reading on the tape 55 is five inches, the vertical light blocking members 51 and 52 would be spaced 2⅝" and would increase ⅛ of an inch for each additional inch that the bellows 23 are extended.

The adjustment of the horizontal light blocking members 49 and 50 is independent of the vertical members 51 and 52. The members 49 and 50 are adjusted to control the amount of light entering the camera. On a dark day, the spacing between the members 49 and 50 will be greater than on a bright day. The members 49 and 50 may be calibrated and a light meter may be consulted in connection with their proper setting.

The members 49 and 50 are adjusted by a hand wheel 56 on one side of the housing 36, having a shaft 57 carrying gears 58, meshing with rack bars 59 and 60 connected with members 49 and 50, respectively. In a similar manner, the members 51 and 62 are adjusted by a hand wheel 61 on the bottom of housing 36, having a gear 62 thereon meshing with horizontal rack bars 63 and 64 in turn connected directly to the members 51 and 52, respectively as best shown in FIGURE 5. It is also contemplated to render the adjustment of the rectangular slit 53 automatic with the extension or retraction of the camera bellows. The manual adjustment shown herein are for simplicity of illustration and are entirely satisfactory in the successful operation of the invention.

Again referring to the lenticular screen assembly 26, three good quality lenticular screens are selected, preferably each formed by laminating a thin plastic transparent sheet to a relatively rigid backing plate of glass. In some instances, the individual screens may be formed entirely of plastic or entirely of glass. In any event, the three screens 27, 28 and 29 are of exactly the same thickness and each has the same number of minute lens elements per square inch formed therein. These lens elements have previously been identified by the numeral 54, FIGURE 7. The lens elements 54 all extend vertically when the screen assembly is in the holder 24 and therefore extend at right angles to the major horizontal axis of light slit 53. The forwardmost lenticular screen 27 has its lens element 54 projecting forwardly or away from the film 25 and has its smooth side 65 abutting the smooth side of the screen 28 in back-to-back relation as shown in FIGURE 7.

The two screens 27 and 28 which are matched are placed back-to-back and cemented together as a unit after certain preliminary procedures. The camera is focused sharp on an object and the object is viewed through the two screens 27 and 28 only. The screens are lined up vertically and the object being viewed should be clear. If the background appears cramped or blurred, it will be necessary to slightly space or place padding between the screens 27 and 28 around their marginal edge portions. This can be done by placing several thicknesses of film, as required, between the screens 27 and 28 near their margins. The major central portions of the areas of the screens do not receive any padding. The two screens may be clamped together temporarily until final adjustment is made. The two screens are turned to a horizontal position and rotated. When viewed in a vertical position through the screens, the object may appear perfectly clear but when the screens are turned over or reversed the picture may appear somewhat cramped or blurred. The side of the assembly which appears most perfect is the side which faces the camera lenses during use. After these procedures, the two screens 27 and 28 are permanently cemented together as a unit.

It may be possible and practical in some instances to form the screens 27 and 28 as a single unitary screen of double thickness with the minute lens elements 54 pressed or molded in proper alignment on the opposite faces thereof. This would simplify the preliminary adjustment of the screen assembly and reduce cost. This is contemplated within the scope of the invention.

The third lenticular screen 29 is selected and has its lens elements 54 placed in abutting relation with the lens elements of the intermediate screen 28. After further adjustment of the screens, the final assembly is completed by cementing the screens 28 and 29 together with their minute lens elements 54 in contacting tangential relation, as shown in FIGURE 7. The individual lens elements 54 on the screens 28 and 29 are equidistantly spaced. The smooth face 66 of the rearmost screen 29 of the composite assembly 26 is arranged during use in direct abutting relation to the film 25 and with all of the lens elements 54 extending vertically as previously stated. The minute lens elements 54 are preferably cylindrically curved, as shown.

In order to take a stereoscopic instantaneous, one shot, reversal picture with the above-described apparatus, the subject to be photographed is first viewed through the ground glass plate 34 and the image is focused for sharpness on this plate by moving the carriage 18 relative to the lenses 42 and 43 and the subject to be photographed.

When focusing is completed, the film holder 24 with the screen assembly 26 and the photographic film 25 therein is placed in the camera and the opaque panel 30 is pulled out. When the shutter 45 is now operated in the described manner, the film 25 will be instantaneously exposed to light and the taking of the picture ready for development by conventional methods is completed.

After development of the film 25, the stereoscopic picture thereon must be viewed through a lenticular screen having the same number of lens elements per square inch as the several screens employed in the assembly 26 utilized for taking the picture.

The stereoscopic picture thus obtained will reveal a much greater degree of depth or stereoscopic effect than conventional stereoscopic pictures made by the use of a single lenticular screen. It appears that the particular arrangement of three screens as depicted in FIGURE 7 and described herein is critical to the successful making of superior one shot instantaneous stereoscopic pictures according to the invention method.

What is believed to take place regarding the operation of the lenticular screen assembly 26 is the following.

The individual minute lens elements 54 of the forwardmost pair of screens 27 and 28 each act as a pivot or point of reversal for that portion of the light image which impinges upon the front screen 27. That is to say, each small portion or vertical segment of the image passing through the screens 27 and 28 is caused to pivot or reverse at the point of entry into the third or rearmost screen 29. This pivoting or reversing is indicated approximately by the light ray lines in FIGURE 7.

Upon reaching the third or rearmost screen 29 next to the photographic film 25, the image to be photographed, now fully reversed by the front two screens 27 and 28, impinges upon the minute lens elements 54 of screen 29. These minute lens elements cause a spreading out laterally of the image by light refraction and upon reaching the film 25, the image is actually divided into a large number of minute separate portions, with the result that it may be viewed by each eye of an observer from an independent viewpoint. This phenomenon is taught in United States Patent 1,128,979. The image in question is separated or spread by the screen 29 laterally or in the direction of the major horizontal axis of the light slit 53. The net result of the combined action of the three lenticular screens in the assembly 26 is to produce a picture on the film 25 after development which when viewed through a proper lenticular screen has an increased illusion of depth and a clarity or sharpness unrivaled by conventional methods. Additionally, as before pointed out, the illusion of depth is not lost or does not become distorted as the viewer backs away from the picture.

There may be other factors inherent in the function of the screen assembly 26, not fully understood, and which contribute to the superior results obtained. The use of three screens arranged as shown in FIGURE 7 appears to have a beneficial resolving effect on the final image which is not fully understood. The image is rendered clear and sharp. There is also some reflection of light at the oposed flat face of screens 27 and 28 and at the flat face 66 of screen 29 and this reflected light may have a beneficial effect on the photographing process. It is perfectly clear that the superior results are obtained only by use of the screen assembly 26 and by no other arrangement of screens.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described our invention, we claim:

1. In a camera apparatus for taking stereoscopic pictures, a forward condensing lens having a lens aperture at least equal to the average interpupillary distance, a magnifying lens mounted a fixed distance rearwardly of the condensing lens, a shutter mechanism disposed between said lenses, adjustable light gate means disposed between the shutter mechanism and condensing lens and operable to define a light slit, a film holder spaced rearwardly of said lenses, supporting relatively movable means for the film holder and said lenses to allow focusing, and a substantially rigid unitary lenticular screen assembly in the film holder forwardly of a film plate therein, said screen assembly including a rear flat face adapted to directly contact the film plate, a front lenticular face remote from the film plate and an internal portion intermediate the rear and front faces consisting of a multiplicity of opposed tangentially abutting lenticulations which are in precise lateral alignment with each other and fixed with respect to each other and with respect to the lenticulations of said front face, the lenticulations of said front face and said internal portion being in parallelism and consisting of the same number of lenticulations per inch.

2. A lenticular screen assembly for use in a camera for taking stereoscopic pictures said screen assembly being rigid and comprising a forward lenticular substantially rigid plate-like screen having a forward face composed of a multiplicity of identical minute cylindrically curved lens elements and a rear flat face, an intermediate substantially rigid plate-like lenticular screen having a rear face consisting of a multiplicity of minute identical cylindrically curved lens elements extending parallel to the first-named lens elements and being accurately aligned laterally with the first-named lens elements and identical in cross sectional shape therewith, the intermediate screen having a front flat face directly contacting said rear flat face of the forward screen and adhesively bonded thereto, and a rear substantially rigid plate-like lenticular screen having a forward face consisting of a multiplicity of minute identical cylindrically curved lens elements extending parallel to the first and second-named lens elements and being in acurate lateral alignment therewith and abutting directly and tangentialy the lens elements of the intermediate screen, whereby an internal lens portion is produced having multiple pairs of opposed directly engaging lens elements, the rear screen having a rear flat face adapted to directly engage a sensitized film plate in a camera, the intermediate and rear screens being adhesively bonded together so that the three screens form a rigid permanently optically adjusted unit, the forward, intermediate and rear screens initialy being separately formed and being of equal thickness and having an equal number of said minute lens elements per inch.

References Cited by the Examiner

UNITED STATES PATENTS 2,011,263   8/1935   Rantsch _____ 352—81
2,049,694   8/1936   Eggert _____ 95—75

JOHN M. HORAN, *Primary Examiner.*